United States Patent [19]
Kersten et al.

[11] 3,843,723
[45] Oct. 22, 1974

[54] PROCESS FOR THE PRODUCTION OF THIOUREA

[75] Inventors: Hilde Kersten, Trennfurt; Gerhard Meyer, Obernburg, both of Germany

[73] Assignee: Akzo N.V., Arnhem, Netherlands

[22] Filed: Apr. 10, 1972

[21] Appl. No.: 242,833

[30] Foreign Application Priority Data
Apr. 22, 1971  Germany............................ 2119537

[52] U.S. Cl............................................. 260/552 R
[51] Int. Cl......................................... C07c 157/00
[58] Field of Search ................................. 260/552 R

[56] References Cited
UNITED STATES PATENTS
3,501,524  3/1970  Krulik et al..................... 260/552 R FOREIGN PATENTS OR APPLICATIONS
903,864  8/1962  Great Britain.................. 260/552 R Primary Examiner—Leon Zitver
Assistant Examiner—Michael W. Glynn
Attorney, Agent, or Firm—Johnston, Keil, Thompson & Shurtleff

[57]  ABSTRACT

Process for producing thiourea by reacting cyanamide in aqueous solution with hydrogen sulfide while in contact with active carbon as catalyst for the reaction, preferably at temperatures of about 60°–100°C. and gauge pressures of 3–20 atmospheres, thereby achieving high yields within a short reaction time.

7 Claims, No Drawings

PROCESS FOR THE PRODUCTION OF THIOUREA

It is generally known that thiourea can be prepared by the reaction of cyanamide in a weak aqueous solution with hydrogen sulfide at elevated temperatures and under pressure by using a catalyst. There have been suggested a number of solid substances as catalysts, e.g., sulfides of the metals arsenic, antimony, tin, bismuth, cadmium or copper, and also aluminum or chromium hydroxide and silica hydrate as well as insoluble compounds of arsenic, antimony and tin. The catalytic activity of these solid substances is increased by the simultaneous use of acids or bases as disclosed in German Pat. No. 260,061.

It is further known according to German Pat. No. 452,025 that this reaction can be carried out at normal temperature and normal pressure with the use of water-soluble bases such as sodium or potassium hydroxide, piperidine, trimethylamine and especially ammonia.

According to still another process as described in U.S. Pat. No. 1,991,852, an aqueous cyanamide solution is continuously treated in countercurrent flow with hydrogen sulfide in an absorption column at temperatures of 50°C. to 90°C in the presence of ammonia or another hydroxide which forms soluble sulfides.

It is further known to carry out the reaction of cyanamide and hydrogen sulfide in the presence of ammonium sulfide in an organic solvent which is only of limited miscibility with water (see U.S. Pat. No. 2,521,778). According to this process, the aqueous cyanamide solution to be treated is first extracted in an absorption tower with the organic solvent. The obtained cyanamide solution is then reacted at temperatures in the range of 30°C. to 60°C. with a saturated alkaline hydrogen sulfide solution. The resulting reaction mixture consists of an aqueous phase saturated with organic solvent and containing thiourea and an organic phase. The process can be carried out continuously by recycling both the organic solvent and also the aqueous phase containing the thiourea, whereby the aqueous phase becomes saturated in thiourea. After separating off the organic phase, the aqueous phase is cooled and the thiourea is precipitated.

It is also known that one can introduce dry cyanamide in crystalline or molten form for the reaction with hydrogen sulfide (see English Pat. No. 640,976). In this process, the cyanamide is added in portions into an alkali sulfide solution at 30° to 60°C., e.g., under atmospheric pressure, while simultaneously leading in hydrogen sulfide. The process can be carried out either continuously or discontinuously. By maintaining a suitable ratio between the reaction components and the reaction medium, a reaction mixture can be obtained which precipitates crystalline thiourea immediately upon cooling.

A principal object of the present invention is to provide a catalytic process for producing thiourea from cyanamide and hydrogen sulfide at better yields and in shorter reaction times with reaction procedures which are relatively simple to carry out, including the separation of the thiourea product. Other objects and advantages of the invention are explained in greater detail hereinafter.

It has now been found, in accordance with the invention, that one can obtain thiourea in practically quantitative yields after a short reaction time if the treatment of an aqueous cyanamide solution with hydrogen sulfide at elevated temperature and pressure is carried out in contact with active carbon as the catalyst.

In an advantageous manner, one can use an aqueous cyanamide solution as conventionally obtained in the production of free cyanamide, such solutions usually containing between about 25 percent and 35 percent by weight of cyanamide. However, one can also use more dilute solutions as well as more concentrated solutions of the cyanamide in water when working according to the present invention.

It has been determined that the reaction of cyanamide and hydrogen sulfide in an aqueous medium and in contact with the active carbon catalyst is strongly dependent upon the temperature. The reaction speed increases with higher reaction temperatures. However, above about 100°C. there occurs a formation of undesirable by-products, especially dicyanodiamide, and a transposition of thiourea into ammonium rhodanide. The reaction is therefore carried out in the range of about 60°C. to 100°C., preferably from about 70°C. to 80°C.

The reaction speed is also dependent upon the hydrogen sulfide pressure maintained in the reaction zone and increases with increasing pressure. The process of the invention is therefore desirably carried out at pressures of about 3 to 20 atmospheres gauge. At the above-noted temperatures for the reaction, satisfactorily high reaction speeds are obtained by maintaining a pressure in a range of about 5 to 10 atmospheres gauge. The process according to the invention is thus preferably carried out at temperatures in the range of approximately 70°–80°C. and at pressures in the range of approximately 5–10 atmospheres gauge.

A further increase in the rate of the reaction, i.e. the reaction speed or velocity, can be achieved by the addition of a small amount of elementary sulfur or a polysulfide to the reaction mixture. For example, the polysulfide can be introduced as ammonium polysulfide. Also, polysulfide forms by inclusion of small amounts of atmospheric oxygen into the reaction mixture. For purposes of the present invention, it is not essential to make such additions to achieve improved results, and the presence of oxygen dissolved in the aqueous solution might in itself be a sufficient addition. Thus, the amount of sulfur or polysulfide which may be introduced is quite small, e.g., from 0.001 percent by weight up to more significant proportions, e.g., 1 percent or 2 percent by weight with reference to the active carbon. Additions of 0.01 to 0.5 percent by weight with reference to the weight of the active carbon are especially preferred.

The reaction mixture remains nearly neutral. In this pH-range, the dimerization of cyanamide into dicyanodiamide is very slight so that by maintenance of the above-noted temperature and pressure conditions, an almost quantitative yield can be achieved.

The reaction between cyanamide and hydrogen sulfide proceeds as a weakly exothermic reaction. At relatively low throughputs, it is therefore desirable to additionally heat the reactor, e.g., by indirect heat exchange with any suitable liquid or gaseous medium.

The process of the invention can be carried out either continuously or discontinuously by using conventional types of reactors adapted to hold a granulated or particulated solid catalyst. The reaction is preferably carried out in a vertically positioned elongated reaction zone filled with particles of active carbon, e.g., in a single reaction tube or a multi-tubular reactor.

The aqueous cyanamide solution is preferably conducted into the upper part of the reaction zone, e.g., near the top of the catalyst filled reactor, while adding the hydrogen sulfide at any arbitrary point of the reaction zone, preferably however in the lower part so that the hydrogen sulfide gas and liquid cyanamide solution tend to flow countercurrently to each other in a continuous process. In such a continuous process, it is also preferable to maintain the hydrogen sulfide pressure in a range of about 5 to 10 atmospheres gauge and the reaction zone at a temperature of about 70°C. to 80°C. The aqueous solution containing thiourea is then continuously withdrawn at or near the lower end of the reaction zone, e.g., directly at the discharge end of the single tube or multi-tube reactor.

As the essential catalyst of the invention, it is advantageous to use those active carbon types commonly employed as adsorbents and available commercially. It is generally advisable in any continuous process to employ those active carbons which are as abrasion resistant as possible. So-called gas phase active carbons are especially suitable, and the preparation and properties of these and other active carbons are disclosed in detail in such references as "Chemical Technology," Volume II. Chapter 11, pages 645–654, Barnes and Noble, Inc., New York (1971).

The steps of separating and recovering the thiourea product from the initial aqueous thiourea solution obtained as the reaction product are substantially conventional in requiring the thiourea solution to be cooled and filtered. The resulting mother liquor can be concentrated under a vacuum and then returned into the process, e.g., by mixing it with fresh reaction solution, subjecting it to crystallization or using it for the dilution of cyanamide solutions which may be too concentrated for addition directly into the process of the invention. In general, the large bulk of the thiourea product can be recovered in a single crystallization so that it is most useful in a continuous process to draw off the mother liquor, e.g., by filtration or the like, and then recycle this mother liquor with or without concentration by evaporation so as to be mixed with the fresh aqueous cyanamide solution. In a batch process or a series of batch processes, the mother liquor is preferably concentrated at elevated temperature, cooled, and again subjected to crystallization.

The process of the invention is further illustrated by but not limited to the following examples.

EXAMPLES 1–9

In all of these examples as tabulated below, the process was carried out in a double jacketed vertical reaction tube having a length of 1 meter and a diameter of 25 mm. with means to maintain the temperature of the reaction at an approximately constant temperature. This reaction tube was filled with active carbon having a particle size of 1.5 to 2.0 mm., this active carbon having been intimately premixed with 0.5 percent by weight of elementary sulfur. By means of a metering pump, the aqueous cyanide solution was introduced into the top end of the reaction tube while the hydrogen sulfide was conducted in at the lower end of the reaction tube under a predetermined constant temperature. The hot aqueous thiourea solution was then withdrawn at the bottom of the reaction tube, filtered where necessary and then cooled to 15°–20°C. The thiourea crystallized or precipitated in this manner was easily separated and proved to be in a very pure form with a melting point at 178°–180°C. The mother liquor was concentrated and reconducted again to the crystallization mixed with fresh reaction solution.

The reaction conditions and the yields of all the examples are set forth in the following table:

| Ex. No. | Conc. of the cyanamide solution (% by wt.) | $H_2S$-Pressure (atm.gauge) | Reaction Time (min.) | Reaction Temp. (°C.) | Yield (%) |
|---|---|---|---|---|---|
| 1 | 25 | 5.0 | 12 | 80 | 99–99.5 |
| 2 | 25 | 7.5 | 12 | 80 | 99–99.5 |
| 3 | 25 | 10.0 | 12 | 80 | 99–99.5 |
| 4 | 25 | 5.0 | 20 | 70 | 99–99.5 |
| 5 | 25 | 7.5 | 12 | 70 | 99–99.5 |
| 6 | 25 | 10.0 | 12 | 70 | 99–99.5 |
| 7 | 25 | 5.0 | 20 | 80 | 99–99.5 |
| 8 | 15 | 7.5 | 12 | 80 | 99–99.5 |
| 9 | 30 | 10.0 | 20 | 80 | 99–99.5 |

These examples represent the best possible results, i.e. almost quantitative yields, within a number of process variations.

Thus, it will be apparent from Examples 1 to 3 that a nearly quantitative yield of thiourea is achieved already at a pressure of 5 atm. gauge by using a temperature of 80°C. Examples 4 to 6 show that with a reaction temperature of 70°C. either the reaction pressure should be increased or the reaction time lengthened in order to achieve equally high yields. A comparison of Example 1 with Example 7 indicates that with the use of a 25 percent by weight aqueous cyanamide solution and a reaction pressure of 5 atm. gauge as well as a reaction temperature of 80°C., it is possible to achieve practically quantitative yields in only 12 minutes reaction time. Examples 8 and 9 further show that the concentration of the aqueous cyanamide solution within the disclosed range exerts no influence on the yields.

In comparison to known processes, the production of thiourea by the reaction of the present invention has numerous advantages:

1. A very good space-time yield is obtained through the high reaction velocity and selectivity on active carbon as the essential catalyst; no costs arise for the use of additional chemicals beyond those participating in the formation of the reaction products.

2. Due to the absence of additional or extraneous chemicals, there is no need for the recirculation of substances other than the specific components of the reaction itself, e.g., there is no recycle of substances such as ammonia, alkaline materials or organic solvents.

3. The thiourea crystallizes in very pure form because of the absence of additional or extraneous chemicals, and very little or no further purification is needed to recover the pure thiourea product.

4. Because all reaction components are consumed in the reaction without forming residues, it is not necessary to purify either the waste water or any waste air or gaseous products.

5. The above carbon catalyst is readily available and does not require any supplementary, costly dosing or proportioning apparatus.

All of these advantages are taken in addition to the obviously desirable quantitative yields on the order of 99 – 99.5 percent of theory, with reference to the cyanamide. It will be apparent from the reaction equation

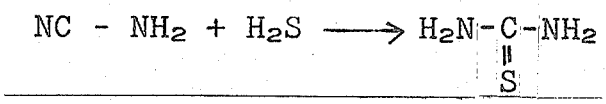

that equimolar amounts of the two reactants are required, but an excess of either reactant may be present in the reaction tube or multi-tube reactor, preferably an excess of hydrogen sulfide to ensure complete reaction of the cyanamide as it passes in solution through the reaction tube or tubes. With high spacetime yields, a continuous process under these preferred conditions provides especially excellent results.

Thus, the process of the invention is not only useful in laboratory or small batch size preparations of thiourea but can also be readily adapted to large scale continuous reactions using any suitable source of cyanamide in aqueous solution.

The invention is hereby claimed as follows:

1. In a process for the catalytic production of thiourea by reacting cyanamide in aqueous solution with hydrogen sulfide at elevated temperature and pressure, the improvement which comprises carrying out said reaction in contact with a bed of active carbon as the catalyst.

2. A process as claimed in claim 1 wherein the reaction is carried out in a vertically positioned elongated reaction zone filled with particles of active carbon.

3. A process as claimed in claim 2 wherein said aqueous cyanide solution and the hydrogen sulfide are directed countercurrently in said reaction zone.

4. A process as claimed in claim 3 wherein said reaction is carried out continuously by continuously introducing the aqueous cyanide solution in the upper part of said reaction zone, adding sufficient hydrogen sulfide to maintain an elevated pressure of about 3 to 20 atmospheres and continuously withdrawing an aqueous solution containing the thiourea product at the bottom of said reaction zone.

5. A process as claimed in claim 4 wherein the reaction temperature is maintained at about 70°C. to 80°C. and the reaction pressure is maintained at from about 5 to 10 atmospheres gauge.

6. A process as claimed in claim 5 wherein there is added to the reaction mixture a catalytic amount of elementary sulfur.

7. A process as claimed in claim 6 wherein said catalytic amount of elementary sulfur is from 0.001 percent up to about 2 percent by weight with reference to the weight of the carbon black.

* * * * *

UNITED STATES PATENT AND TRADEMARK OFFICE
CERTIFICATE OF CORRECTION

PATENT NO. : 3,843,723
DATED : October 22, 1974
INVENTOR(S) : KERSTEN et al

It is certified that error appears in the above-identified patent and that said Letters Patent are hereby corrected as shown below:

```
In Column 6, first line of Claim 4, delete " as claimed
in claim 3 " and substitute -- as claimed in claim 2 --
```

Signed and Sealed this

Sixteenth Day of November 1976

[SEAL]

Attest:

RUTH C. MASON
*Attesting Officer*

C. MARSHALL DANN
*Commissioner of Patents and Trademarks*